United States Patent
Saruwatari

(10) Patent No.: US 7,013,875 B2
(45) Date of Patent: Mar. 21, 2006

(54) APPARATUS FOR CONTROLLING FUEL INJECTION OF ENGINE AND METHOD THEREOF

(75) Inventor: Masayuki Saruwatari, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 274 days.

(21) Appl. No.: 10/606,122

(22) Filed: Jun. 26, 2003

(65) Prior Publication Data

US 2004/0134467 A1   Jul. 15, 2004

(30) Foreign Application Priority Data

Jun. 28, 2002  (JP) ............................. 2002-191034

(51) Int. Cl.
*F02M 51/00*    (2006.01)

(52) U.S. Cl. ...................................... 123/478; 123/180

(58) Field of Classification Search ................ 701/104; 123/90.15, 90.1, 480, 478
See application file for complete search history.

(56) References Cited

U.S. PATENT DOCUMENTS

| | | | |
|---|---|---|---|
| 4,455,987 A * | 6/1984 | Sudbeck et al. | 123/568.27 |
| 5,791,321 A * | 8/1998 | Kondoh | 123/698 |
| 6,550,457 B1 * | 4/2003 | Kitagawa et al. | 123/486 |
| 2003/0062028 A1 * | 4/2003 | Kitagawa et al. | 123/486 |
| 2004/0134467 A1 * | 7/2004 | Saruwatari | 123/458 |

FOREIGN PATENT DOCUMENTS

| | | |
|---|---|---|
| JP | 6-272580 A | 9/1994 |
| JP | 9-195840 A | 7/1997 |
| JP | 2001-012262 A | 1/2001 |
| JP | 2001-041013 A | 2/2001 |
| JP | 2001-164951 A | 6/2001 |

* cited by examiner

*Primary Examiner*—John T. Kwon
(74) *Attorney, Agent, or Firm*—Foley & Lardner LLP

(57) ABSTRACT

In an engine provided with a variable valve event and lift mechanism that varies a valve lift and a valve operating angle of an intake valve, a pressure of fuel supplied to a fuel injection valve is controlled according to an opening period of the intake valve, which is varied according to the valve operating angle and an engine rotation speed.

20 Claims, 17 Drawing Sheets

APPARATUS FOR CONTROLLING FUEL INJECTION OF ENGINE AND METHOD THEREOF

FIELD OF THE INVENTION

The present invention relates to an apparatus for controlling fuel injection in an engine provided with a fuel injection valve on the upstream side of an intake valve, and a method thereof.

RELATED ART OF THE INVENTION

Heretofore, there has been known a control system in which an operating characteristic of an intake valve is changed so that a target intake air amount of an engine can be obtained (refer to Japanese Unexamined Patent Publication No. 6-272580).

Further, there has also been known a variable valve event and lift mechanism that varies continuously a valve lift of an engine valve together with a valve operating angle thereof (refer to Japanese Unexamined Patent Publication No. 2001-012262)

Here, when a valve lift of an intake valve is controlled by the variable valve event and lift mechanism to adjust an intake air amount of an engine, the valve lift of the intake valve is controlled to be smaller together with a valve operating angle thereof.

If the valve lift of the intake valve becomes smaller, since an intake air flow at an intake stroke is strengthened, an atomization effect of fuel can be achieved.

However, if the valve operating angle becomes smaller, since an opening period of the intake valve becomes shorter, it is impossible to inject all of fuel within the opening period of the intake valve, and therefore, sometimes, fuel injection needs to be started before opening timing of the intake valve.

The fuel injected before the opening timing of the intake valve, stays on the upstream side of the intake valve, and is sucked into a cylinder all at once immediately after the intake valve opening.

Consequently, there is a problem in that, if the fuel is injected before the opening timing of the intake valve, a uniform air-fuel mixture in the cylinder is not formed.

SUMMARY OF THE INVENTION

It is therefore an object of the present invention to enable to form in a cylinder, a uniform air-fuel mixture with excellent combustion stability, in a condition where a valve lift of an intake valve is low and a valve operating angle thereof is small.

In order to accomplish the above-mentioned object, according to the present invention, an injection quantity per unit time of a fuel injection valve is variably controlled according to an opening period of an intake valve.

The other objects and features of the invention will become understood from the following description with reference to the accompanying drawings.

DESCRIPTION OF THE PREFERRED EMBODIMENT

Figure 1:
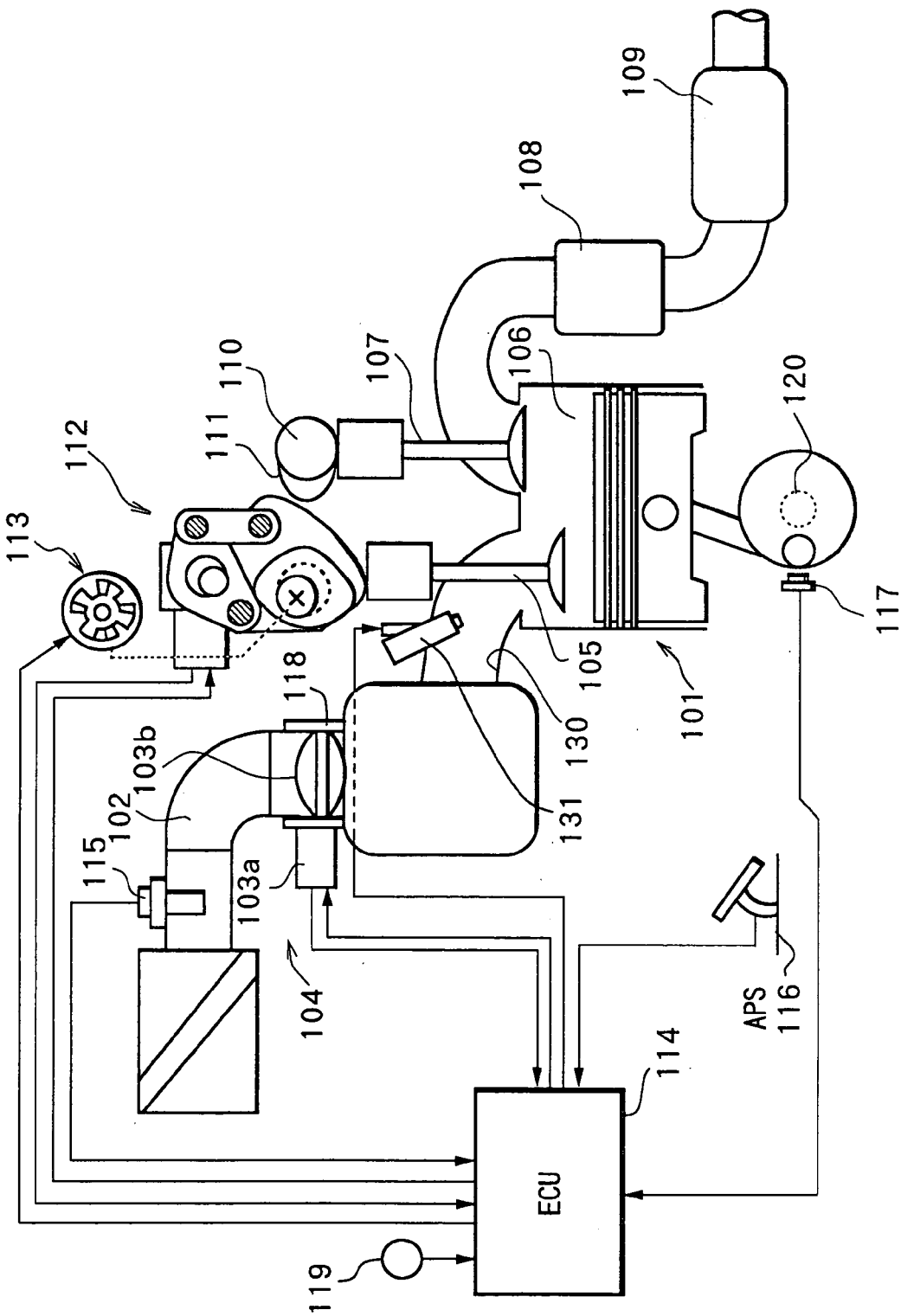
FIG. 1 is a diagram of a system structure of an engine in an embodiment.

FIG. 1 shows an engine for vehicle.

In FIG. 1, an intake passage 102 of an engine 101 is disposed with an electronically controlled throttle 104.

Electronically controlled throttle 104 is constructed to drive a throttle valve 103b to open and close by a throttle motor 103a.

Air is sucked into a combustion chamber 106 via electronically controlled throttle 104 and an intake valve 105.

A combusted exhaust gas is discharged from combustion chamber 106 via an exhaust valve 107, purified by a front catalyst 108 and a rear catalyst 109, and then emitted into the atmosphere.

Exhaust valve 107 is driven to open and close by a cam 111 axially supported by an exhaust side camshaft 110, while keeping a fixed valve lift and a fixed valve operating angle thereof.

Intake valve 105 is provided with a VEL (Variable valve Event and Lift) mechanism 112 that performs continuously a variable control of a valve lift together with a valve operating angle, and a VTC (Variable valve Timing Control) mechanism 113 that performs continuously a variable control of a central phase of the valve operating angle.

Exhaust valve 107 may be provided with a variable valve mechanism.

An engine control unit (ECU) 114 incorporates therein a microcomputer.

Engine control unit 114 controls electronically controlled throttle 104, VEL mechanism 112 and VTC mechanism 113, so that a target intake air amount corresponding to an accelerator opening can be obtained.

Engine control unit 114 receives detection signals from various sensors.

Various sensors include an air flow meter 115 detecting an intake air amount Q of engine 101, an accelerator sensor 116 detecting an accelerator opening, a crank angle sensor 117 taking out a rotation signal from a crankshaft 120, a throttle sensor 118 detecting an opening TVO of throttle valve 103b, and a water temperature sensor 119 detecting a cooling water temperature Tw of engine 101.

In engine control unit 114, an engine rotation speed Ne is calculated based on the rotation signal output from crank angle sensor 117.

Further, an electromagnetic fuel injection valve 131 is disposed on an intake port 130 at the upstream side of intake valve 105 of each cylinder.

Fuel injection valve 131 injects fuel of a quantity proportional to an injection pulse width (valve opening period), when driven to open by an injection pulse signal from engine control unit 114.

Figure 2:
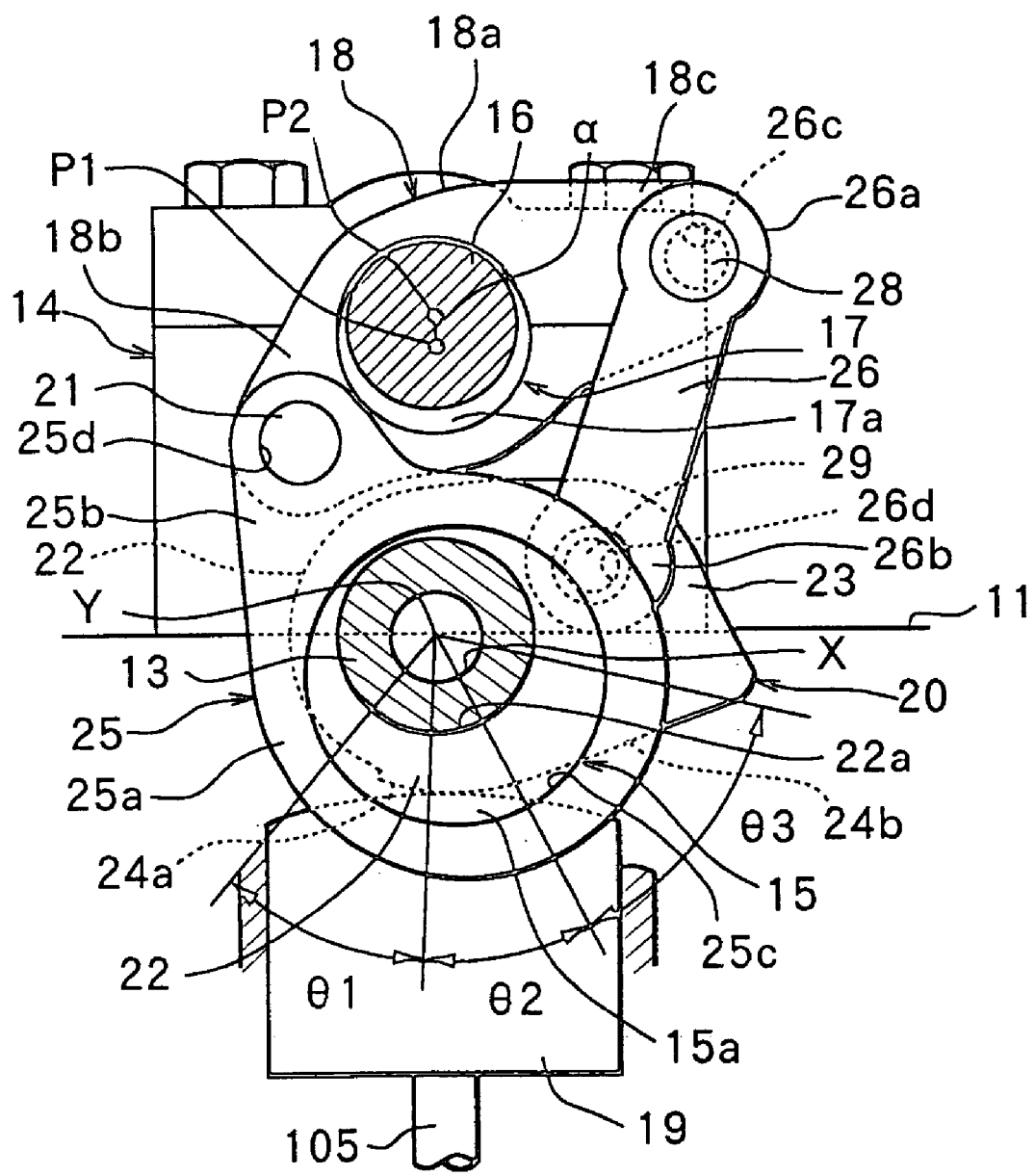
FIG. 2 is a cross section view showing a variable valve event and lift mechanism (A—A cross section of FIG. 3) in the embodiment.
Figure 3:
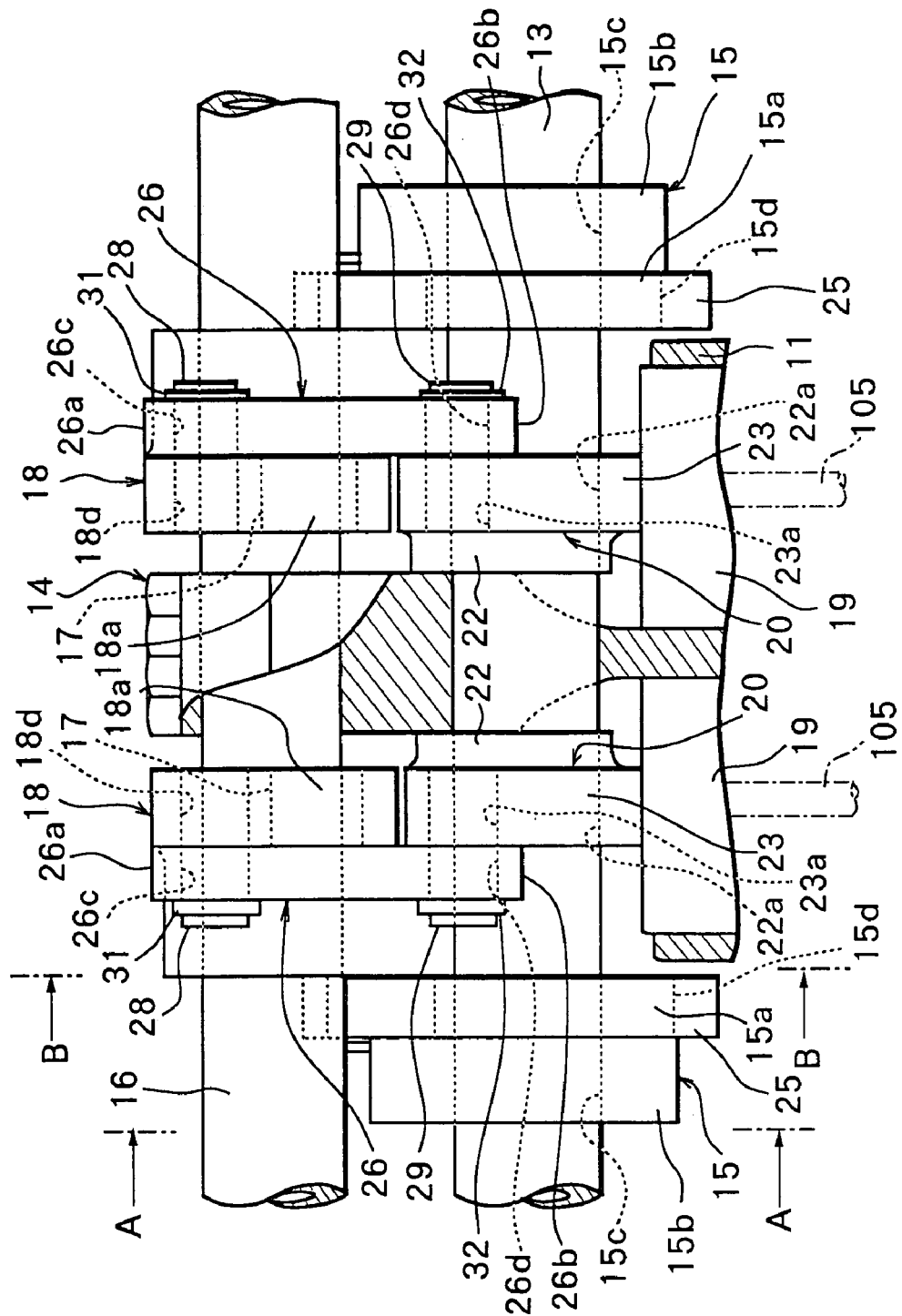
FIG. 3 is a side elevation view of the variable valve event and lift mechanism.
Figure 4:
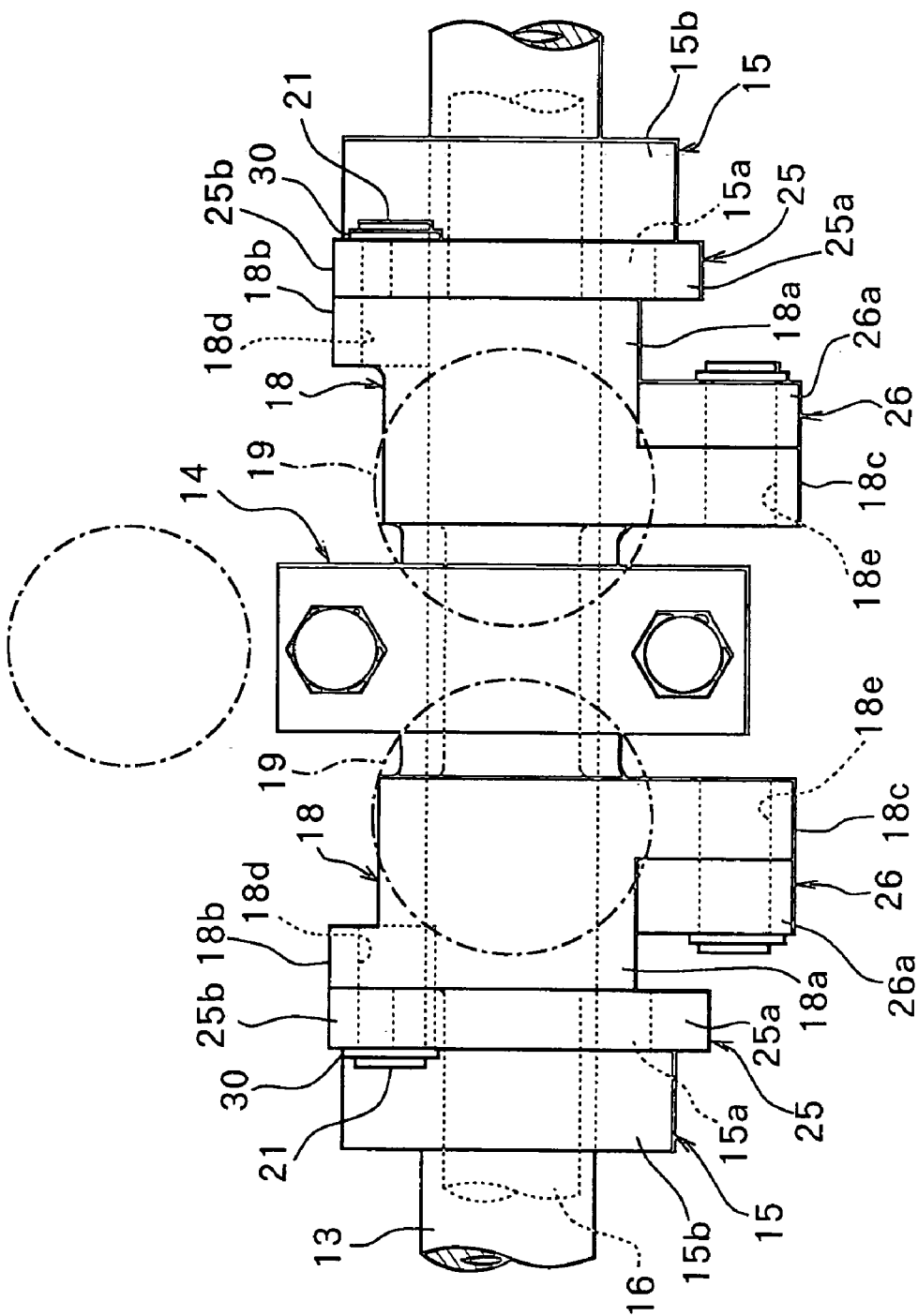
FIG. 4 is a top plan view of the variable valve event and lift mechanism.

FIG. 2 to FIG. 4 show in detail the structure of VEL mechanism 112.

Note, a mechanism that performs continuously the variable control of the valve lift and the valve operating angle of intake valve 105 is not limited to the mechanism shown in FIG. 2 to FIG. 4.

VEL mechanism 112 shown in FIG. 2 to FIG. 4 includes a pair of intake valves 105, 105, a hollow camshaft (drive shaft) 13 rotatably supported by a cam bearing 14 of a cylinder head 11, two eccentric cams (drive cams) 15, 15 axially supported by camshaft 13, a control shaft 16 rotatably supported by cam bearing 14 and arranged at an upper position of camshaft 13, a pair of rocker arms 18, 18 swingingly supported by control shaft 16 through a control cam 17, and a pair of independent swing cams 20, 20 disposed to upper end portions of intake valves 105, 105 through valve lifters 19, 19, respectively.

Eccentric cams 15, 15 are connected with rocker arms 18, 18 by link arms 25, 25, respectively. Rocker arms 18, 18 are connected with swing cams 20, 20 by link members 26, 26.

Rocker arms 18, 18, link arms 25, 25, and link members 26, 26 constitute a transmission mechanism.

Figure 5:
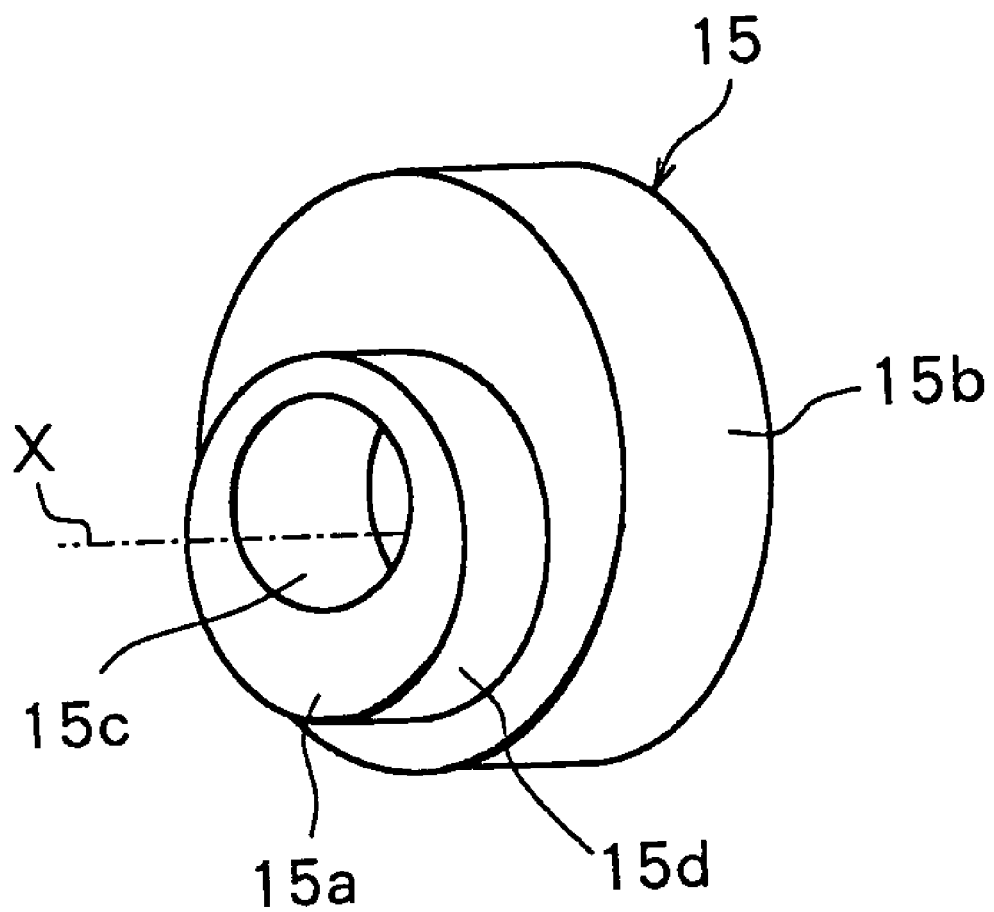
FIG. 5 is a perspective view showing an eccentric cam for use in the variable valve event and lift mechanism.

Each eccentric cam 15, as shown in FIG. 5, is formed in a substantially ring shape and includes a cam body 15a of small diameter and a flange portion 15b integrally formed on an outer surface of cam body 15a. An insertion hole 15c is formed through the interior of eccentric cam 15 in an axial direction, and also a center axis X of cam body 15a is biased from a center axis Y of camshaft 13 by a predetermined amount.

Eccentric cams 15, 15 are pressed and fixed to camshaft 13 via camshaft insertion holes 15c at outside positions not interfering with valve lifters 19, 19, respectively.

Each rocker arm 18, as shown in FIG. 4, is bent and formed in a substantially crank shape, and a central base portion 18a thereof is rotatably supported by control cam 17.

A pin hole 18d is formed through one end portion 18b which is formed to protrude from an outer end portion of base portion 18a. A pin 21 to be connected with a tip portion of link arm 25 is pressed into pin hole 18d. Also, a pin hole 18e is formed through the other end portion 18c which is formed to protrude from an inner end portion of base portion 18a. A pin 28 to be connected with one end portion 26a (to be described later) of each link member 26 is pressed into pin hole 18e.

Control cam 17 is formed in a cylindrical shape and fixed to a periphery of control shaft 16. As shown in FIG. 2, a center axis P1 position of control cam 17 is biased from a center axis P2 position of control shaft 16 by α.

Figure 6:
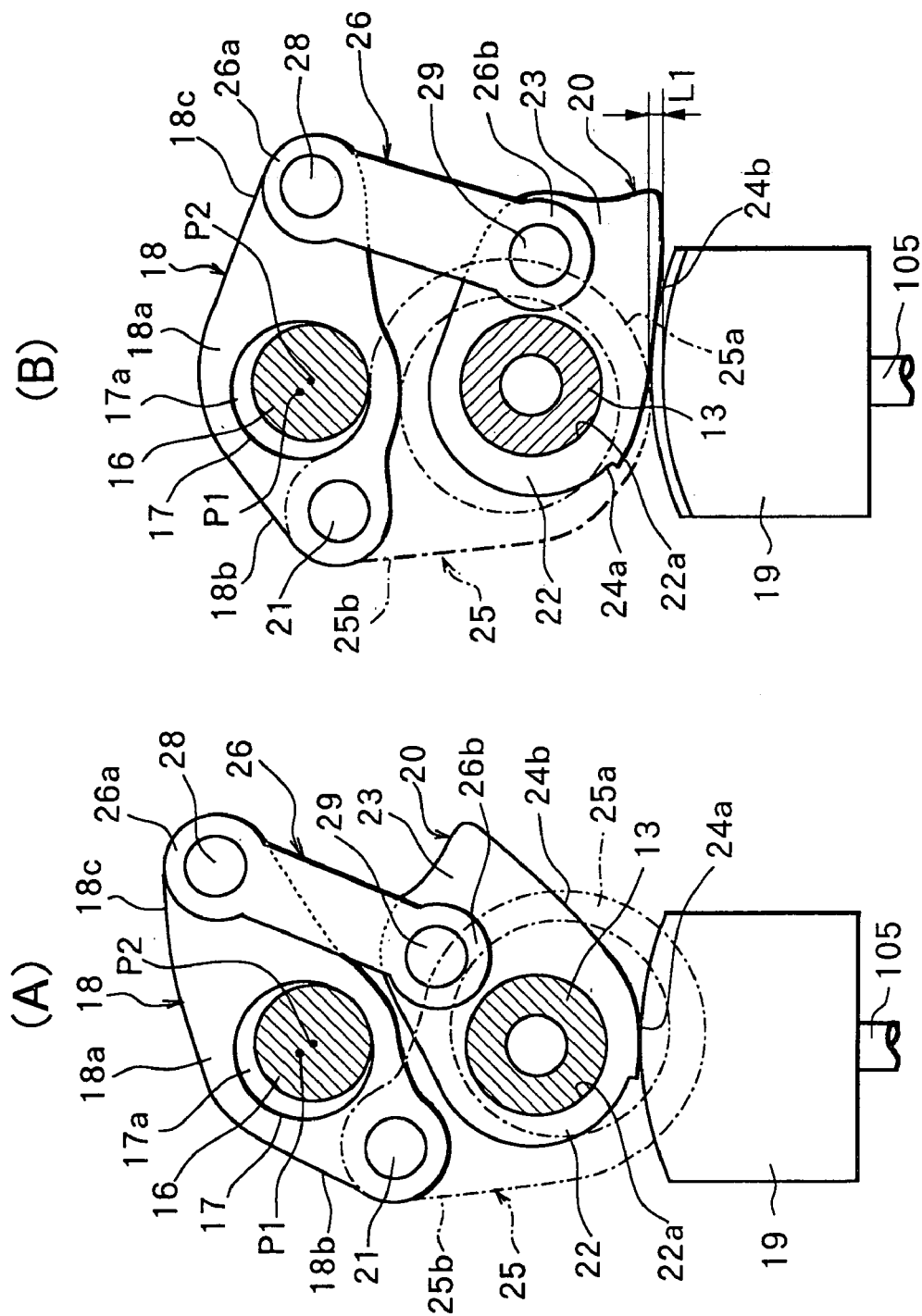
FIGS. 6(A) and (B) are cross section views showing a low lift control condition of the variable valve event and lift mechanism (B—B cross section view of FIG. 3).
Figure 7:
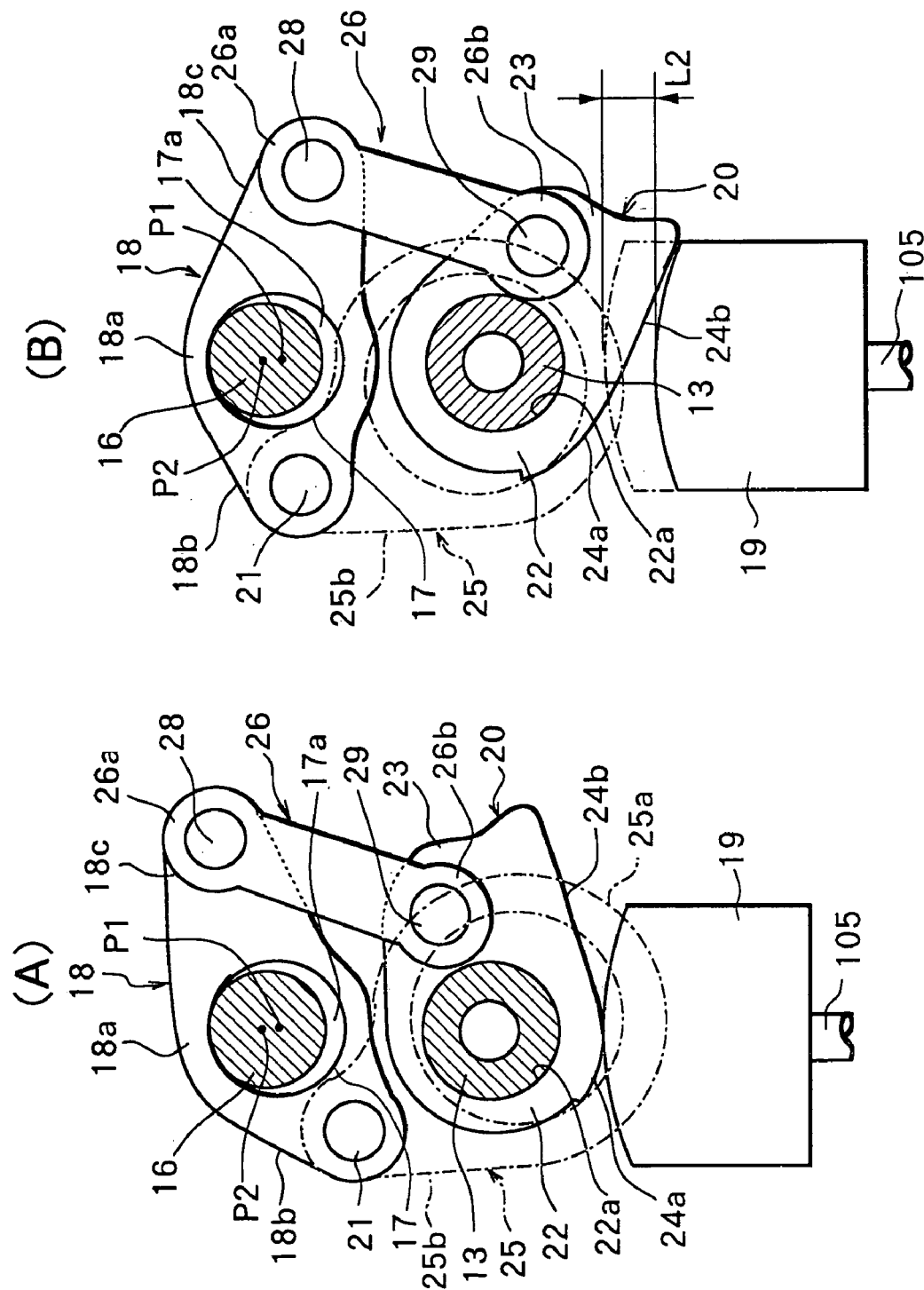
FIGS. 7(A) and (B) are cross section views showing a high lift control condition of the variable valve event and lift mechanism (B—B cross section view of FIG. 3).

Swing cam 20 is formed in a substantially lateral U-shape as shown in FIG. 2, FIG. 6 and FIG. 7, and a supporting hole 22a is formed through a substantially ring-shaped base end portion 22. Camshaft 13 is inserted into supporting hole 22a to be rotatably supported. Also, a pin hole 23a is formed through an end portion 23 positioned at the other end portion 18c side of rocker arm 18.

A base circular surface 24a of base end portion 22 side and a cam surface 24b extending in an arc shape from base circular surface 24a to an edge of end portion 23, are formed on a bottom surface of swing cam 20. Base circular surface 24a and cam surface 24b are in contact with a predetermined position of an upper surface of each valve lifter 19 corresponding to a swing position of swing cam 20.

Figure 8:
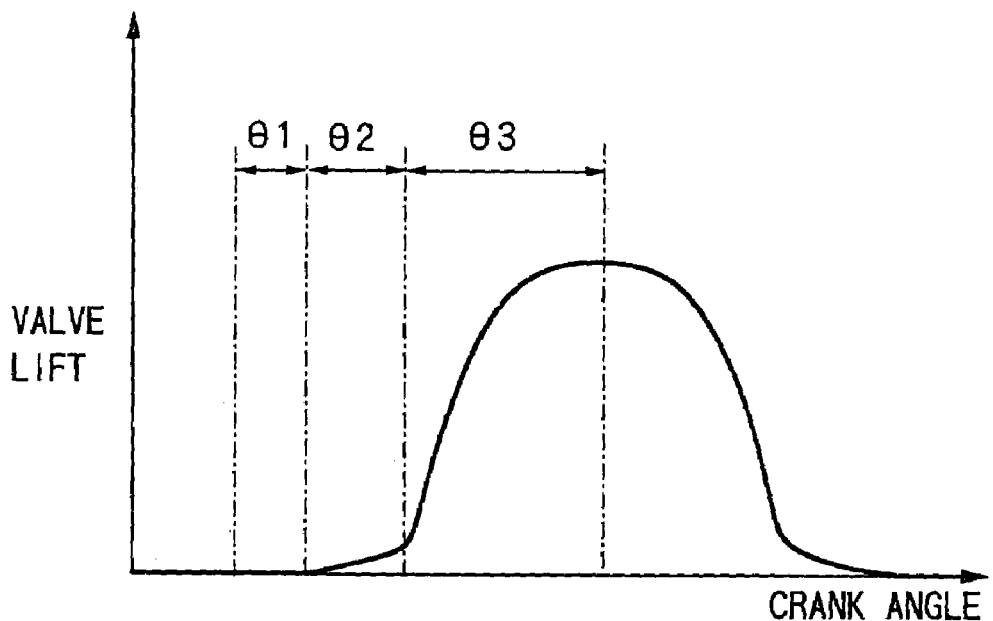
FIG. 8 is a characteristic diagram showing a correlation between a cam face and a valve lift in the variable valve event and lift mechanism.

Namely, according to a valve lift characteristic shown in FIG. 8, as shown in FIG. 2, a predetermined angle range θ1 of base circular surface 24a is a base circle interval and a range of from base circle interval θ1 of cam surface 24b to a predetermined angle range θ2 is a so-called ramp interval, and a range of from ramp interval θ2 of cam surface 24b to a predetermined angle range θ3 is a lift interval.

Link arm 25 includes a ring-shaped base portion 25a and a protrusion end 25b protrudingly formed on a predetermined position of an outer surface of base portion 25a. A fitting hole 25c to be rotatably fitted with the outer surface of cam body 15a of eccentric cam 15 is formed on a central position of base portion 25a. Also, a pin hole 25d into which pin 21 is rotatably inserted is formed through protrusion end 25b.

Link member 26 is formed in a linear shape of predetermined length and pin insertion holes 26c, 26d are formed through both circular end portions 26a, 26b. End portions of pins 28, 29 pressed into pin hole 18d of the other end portion 18c of rocker arm 18 and pin hole 23a of end portion 23 of swing cam 20, respectively, are rotatably inserted into pin insertion holes 26c, 26d.

Snap rings 30, 31, 32 restricting axial transfer of link arm 25 and link member 26 are disposed on respective end portions of pins 21, 28, 29.

In such a constitution, depending on a positional relation between the center axis P2 of control shaft 16 and the center axis P1 of control cam 17, as shown in FIG. 6 and FIG. 7, the valve lift is varied, and by driving control shaft 16 to rotate, the position of the center axis P2 of control shaft 16 relative to the center axis P1 of control cam 17 is changed.

Figure 9:
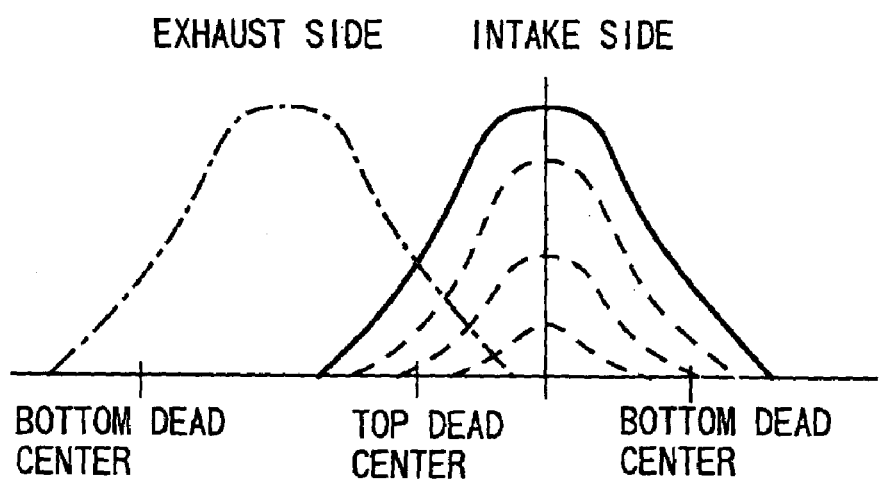
FIG. 9 is a characteristic diagram showing a correlation between the valve lift and a valve operating angle in the variable valve event and lift mechanism.
Figure 10:
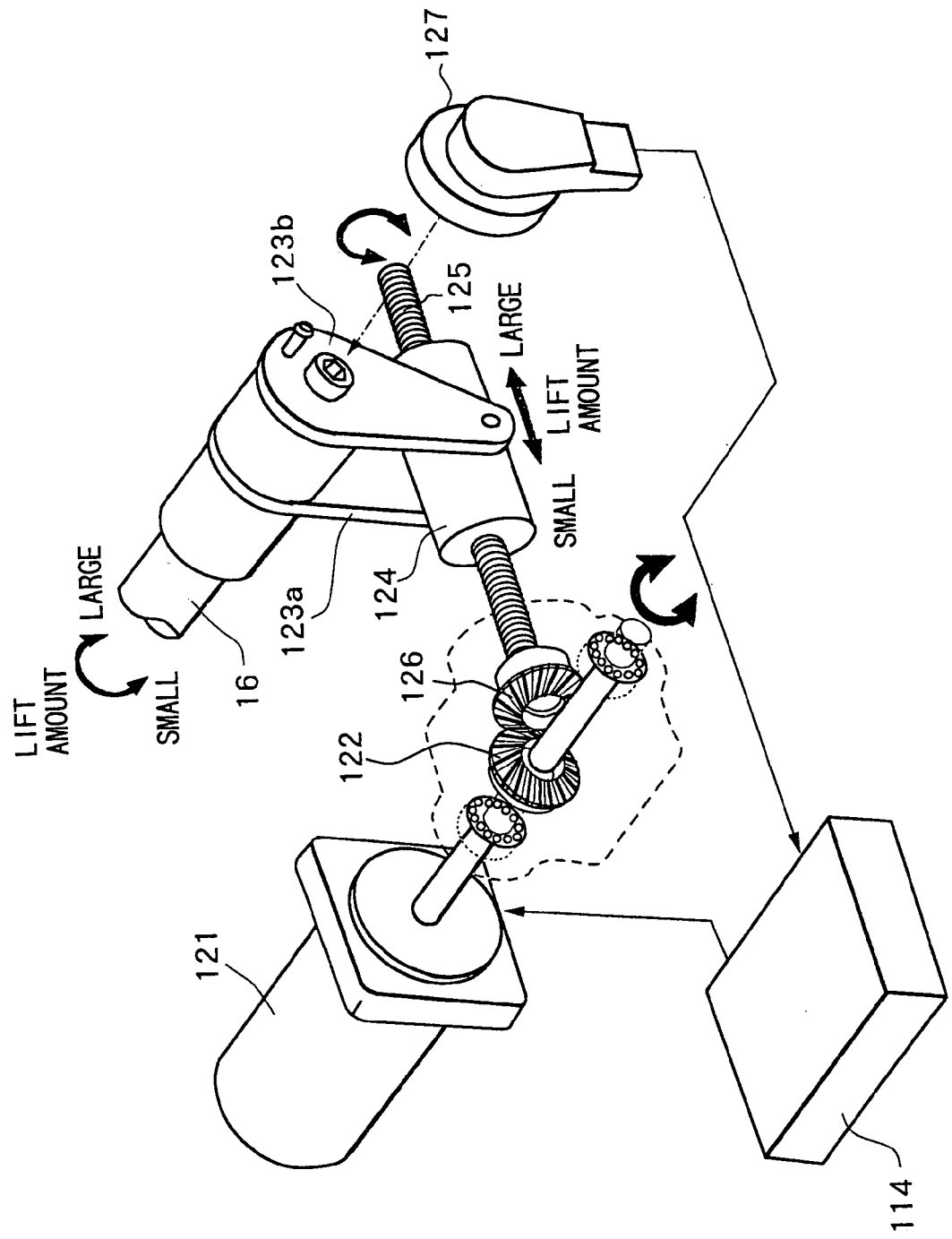
FIG. 10 is a perspective view showing a driving mechanism of a control shaft in the variable valve event and lift mechanism.

Control shaft 16 is driven to rotate within a predetermined angle range by a DC servo motor (actuator) 121 as shown in FIG. 10. By varying an operating angle of control shaft 16 by actuator 121, the valve lift and valve operating angle of each intake valve 105 are continuously varied (refer to FIG. 9).

In FIG. 10, DC servo motor 121 is arranged so that the rotation shaft thereof is parallel to control shaft 16, and a bevel gear 122 is axially supported by the tip portion of the rotation shaft.

On the other hand, a pair of stays 123a, 123b are fixed to the tip end of control shaft 16. A nut 124 is swingingly supported around an axis parallel to control shaft 16 connecting the tip portions of the pair of stays 123a, 123b.

A bevel gear 126 meshed with bevel gear 122 is axially supported at the tip end of a threaded rod 125 engaged with nut 124. Threaded rod 125 is rotated by the rotation of DC servo motor 121, and the position of nut 124 engaged with threaded rod 125 is displaced in an axial direction of threaded rod 125, so that control shaft 16 is rotated.

Here, the valve lift is decreased as the position of nut 124 approaches bevel gear 126, while the valve lift is increased as the position of nut 124 gets away from bevel gear 126.

Further, a potentiometer type operating angle sensor 127 detecting the operating angle of control shaft 16 is disposed on the tip end of control shaft 16, as shown in FIG. 10. Control unit 114 feedback controls DC servo motor 121 so that an actual operating angle detected by operating angle sensor 127 coincides with a target operating angle.

Next, the structure of VTC mechanism 113 will be described based on FIG. 11.

Figure 11:
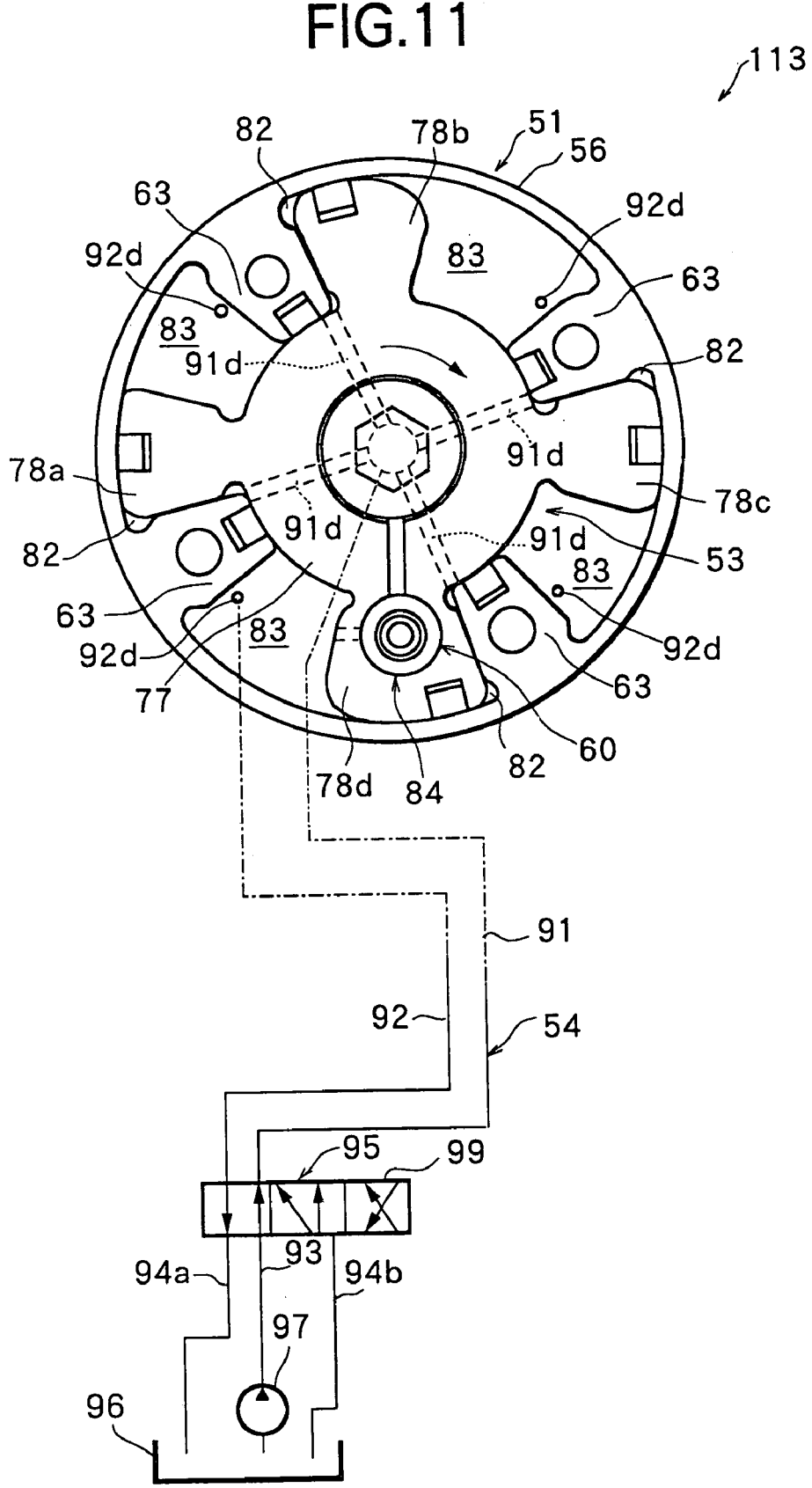
FIG. 11 is a longitudinal cross section view of a variable valve timing mechanism.

However, VTC mechanism 113 is not limited to the constitution shown in FIG. 11, and may be constituted to continuously vary a rotation phase of camshaft relative to a crankshaft.

VTC mechanism 113 in this embodiment is a so-called vane type variable valve timing mechanism, and comprises: a cam sprocket 51 (timing sprocket) which is rotatably driven by a crankshaft 120 via a timing chain; a rotation member 53 secured to an end portion of an intake side camshaft 13 and rotatably housed inside cam sprocket 51; a hydraulic circuit 54 that relatively rotates rotation member 53 with respect to cam sprocket 51; and a lock mechanism 60 that selectively locks a relative rotation position between cam sprocket 51 and rotation member 53 at predetermined positions.

Cam sprocket 51 comprises: a rotation portion (not shown in the figure) having on an outer periphery thereof, teeth for engaging with timing chain (or timing belt); a housing 56 located forward of the rotation portion, for rotatably housing rotation member 53; and a front cover and a rear cover (not shown in the figure) for closing the front and rear openings of housing 56.

Housing 56 presents a cylindrical shape formed with both front and rear ends open and with four partition portions 63 protrudingly provided at positions on the inner peripheral face at 90° in the circumferential direction, four partition portions 63 presenting a trapezoidal shape in transverse section and being respectively provided along the axial direction of housing 56.

Rotation member 53 is secured to the front end portion of camshaft and comprises an annular base portion 77 having four vanes 78a, 78b, 78c, and 78d provided on an outer peripheral face of base portion 77 at 90° in the circumferential direction.

First through fourth vanes 78a to 78d present respective cross-sections of approximate trapezoidal shapes. The vanes are disposed in recess portions between each partition portion 63 so as to form spaces in the recess portions to the front and rear in the rotation direction. An advance angle side hydraulic chambers 82 and a retarded angle side hydraulic chambers 83 are thus formed.

Lock mechanism 60 has a construction such that a lock pin 84 is inserted into an engagement hole (not shown in the figure) at a rotation position (in the reference operating condition) on the maximum retarded angle side of rotation member 53.

Hydraulic circuit 54 has a dual system oil pressure passage, namely a first oil pressure passage 91 for supplying and discharging oil pressure with respect to advance angle side hydraulic chambers 82, and a second oil pressure passage 92 for supplying and discharging oil pressure with respect to retarded angle side hydraulic chambers 83. To these two oil pressure passages 91 and 92 are connected a supply passage 93 and drain passages 94a and 94b, respectively, via an electromagnetic switching valve 95 for switching the passages.

An engine driven oil pump 97 for pumping oil in an oil pan 96 is provided in supply passage 93, and the downstream ends of drain passages 94a and 94b are communicated with oil pan 96.

First oil pressure passage 91 is formed substantially radially in a base 77 of rotation member 53, and connected to four branching paths 91d communicating with each advance angle side hydraulic chamber 82. Second oil pressure passage 92 is connected to four oil galleries 92d opening to each retarded angle side hydraulic chamber 83.

With electromagnetic switching valve 95, an internal spool valve is arranged so as to control the switching between respective oil pressure passages 91 and 92, and supply passage 93 and drain passages 94a and 94b.

Engine control unit 114 controls the power supply quantity for an electromagnetic actuator 99 that drives electromagnetic switching valve 95, based on a duty control signal superimposed with a dither signal.

For example, when a control signal of duty ratio 0% (OFF signal) is output to electromagnetic actuator 99, the hydraulic fluid pumped from oil pump 47 is supplied to retarded angle side hydraulic chambers 83 via second oil pressure passage 92, and the hydraulic fluid in advance angle side hydraulic chambers 82 is discharged into oil pan 96 from first drain passage 94a via first oil pressure passage 91.

Consequently, an inner pressure of retarded angle side hydraulic chambers 83 becomes a high pressure while an inner pressure of advance angle side hydraulic chambers 82 becomes a low pressure, and rotation member 53 is rotated to the most retarded angle side by means of vanes 78a to 78d. The result of this is that a valve opening period (opening timing and closing timing) is delayed relative to a rotation phase angle of crankshaft.

On the other hand, when a control signal of duty ratio 100% (ON signal) is output to electromagnetic actuator 99, the hydraulic fluid is supplied to inside of advance angle side hydraulic chambers 82 via first oil pressure passage 91, and the hydraulic fluid in retarded angle side hydraulic chambers 83 is discharged to oil pan 96 via second oil pressure passage 92, and second drain passage 94b, so that retarded angle side hydraulic chambers 83 become a low pressure.

Therefore, rotation member 53 is rotated to the full to the advance angle side by means of vanes 78a to 78d. Due to this, the opening period of intake valve 105 is advanced relative to the rotation phase angle of crankshaft.

Note, the variable valve timing mechanism is not limited to the one of vane type as described above, and may be the one constituted to vary the rotation phase of camshaft relative to the crankshaft by a friction braking of electromagnetic clutch (electromagnetic brake), as shown in Japanese Unexamined Patent Publication 2001-041013 or 2001-164951, or the one constituted to operate a helical gear by a hydraulic pressure as shown in Japanese Unexamined Patent Publication 9-195840.

Figure 12:
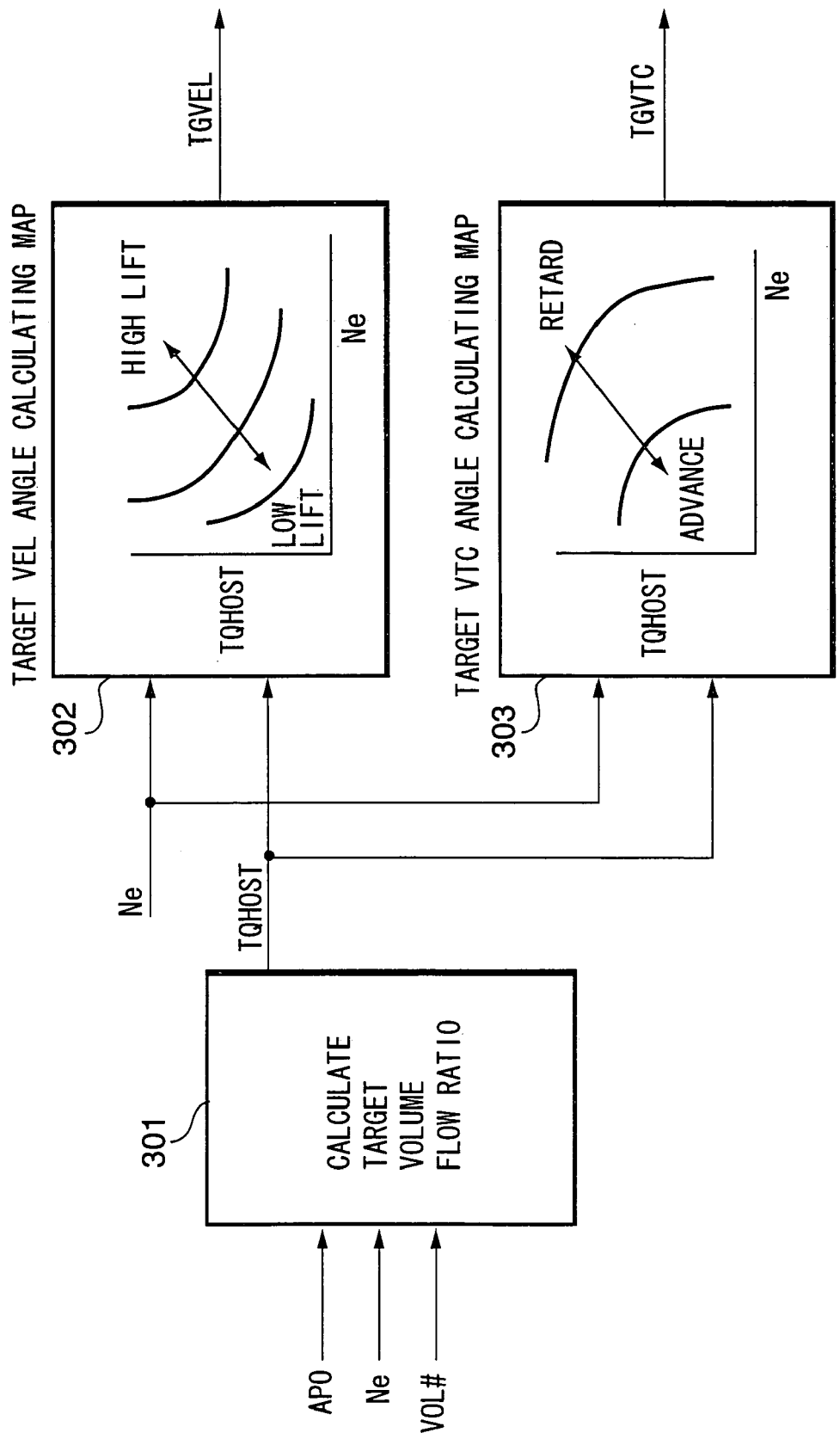
FIG. 12 is a block diagram showing an intake air amount control in the embodiment.
Figure 13:
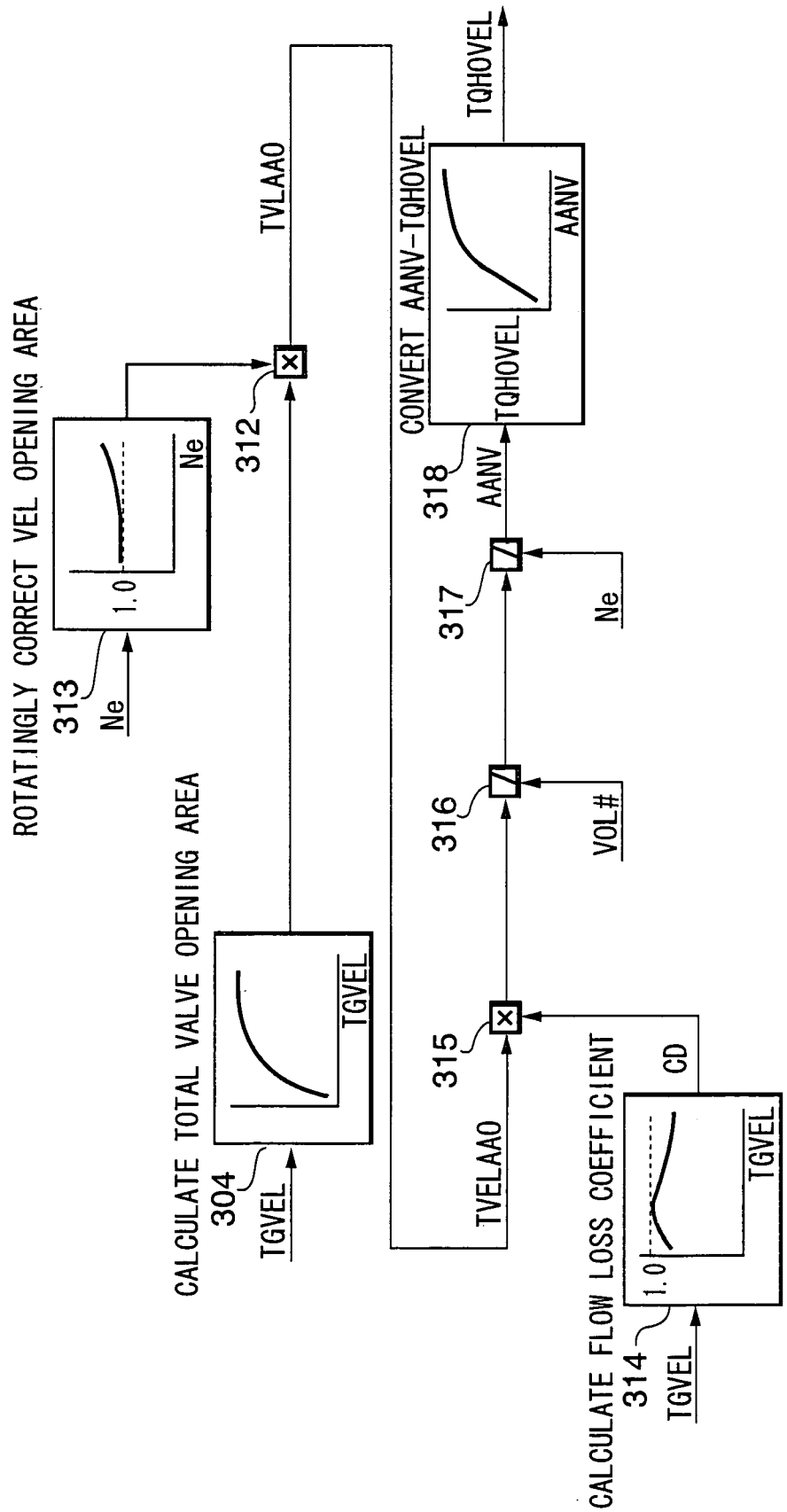
FIG. 13 is a block diagram showing the intake air amount control in the embodiment.

Next, there will be described controls of electronically controlled throttle 104, VEL mechanism 112 and VTC mechanism 113, by engine control unit 114, referring to block diagrams of FIG. 12 to FIG. 14.

In a target volume flow ratio calculating section 301, a target volume flow ratio TQH0ST (target intake air amount) of engine 101 is calculated in the following manner.

Firstly, a requested air amount Q0 corresponding to accelerator opening APO and engine rotation speed Ne is calculated, and also a requested air amount QISC requested in an idle rotation speed control is calculated.

Then, the sum of requested air amount Q0 and requested air amount QISC is obtained as a total requested air amount Q.

$$Q=Q0+QISC$$

Next, total requested air amount Q is divided by engine rotation speed Ne and an effective discharge amount (total cylinder volume) VOL# to calculate target volume flow ratio TQH0ST.

$$TQH0ST=Q/(Ne \cdot VOL\#)$$

In a target VEL operating angle calculating section 302, a target operating angle TGVEL of control shaft 16 in VEL mechanism 112 is calculated, based on target volume flow ratio TQH0ST and engine rotation speed Ne.

VEL mechanism 112 is controlled based on target operating angle TGVEL.

Here, the larger target volume flow ratio TQH0ST is and the higher engine rotation speed Ne is, target operating angle TGVEL at which the valve lift becomes larger, is set.

On the other hand, in a low lift region where target volume flow ratio TQH0ST is small and engine rotation speed Ne is low, target operating angle TGVEL at which the closing timing of intake valve 105 is before the bottom dead center, is set.

However, on the low load and low rotation speed side, due to the minimum limit of the valve lift, a valve lift amount larger than a requested value corresponding to target volume flow ratio TQH0ST is set.

Then, an excess portion is corrected by a throttle control of throttle valve 103b as described later.

In this embodiment, as the operating angle of control shaft 16 becomes larger, the valve lift of intake valve 105 becomes larger.

In a VTC target angle calculating section 303, a target phase angle TGVTC (target advance angle) in VTC mechanism 113 is calculated based on target volume flow ratio TQH0ST and engine rotation speed Ne.

VTC mechanism 113 is controlled based on target phase angle TGVTC (target advance angle).

Here, the larger target volume flow TQH0ST is and the higher engine rotation speed Ne is, target valve timing is retarded.

That is, the larger the valve lift (valve operating angle) is, valve timing is retarded so that the valve operating angle and the valve lift are varied, while opening timing of intake valve being substantially constant.

Figure 16:
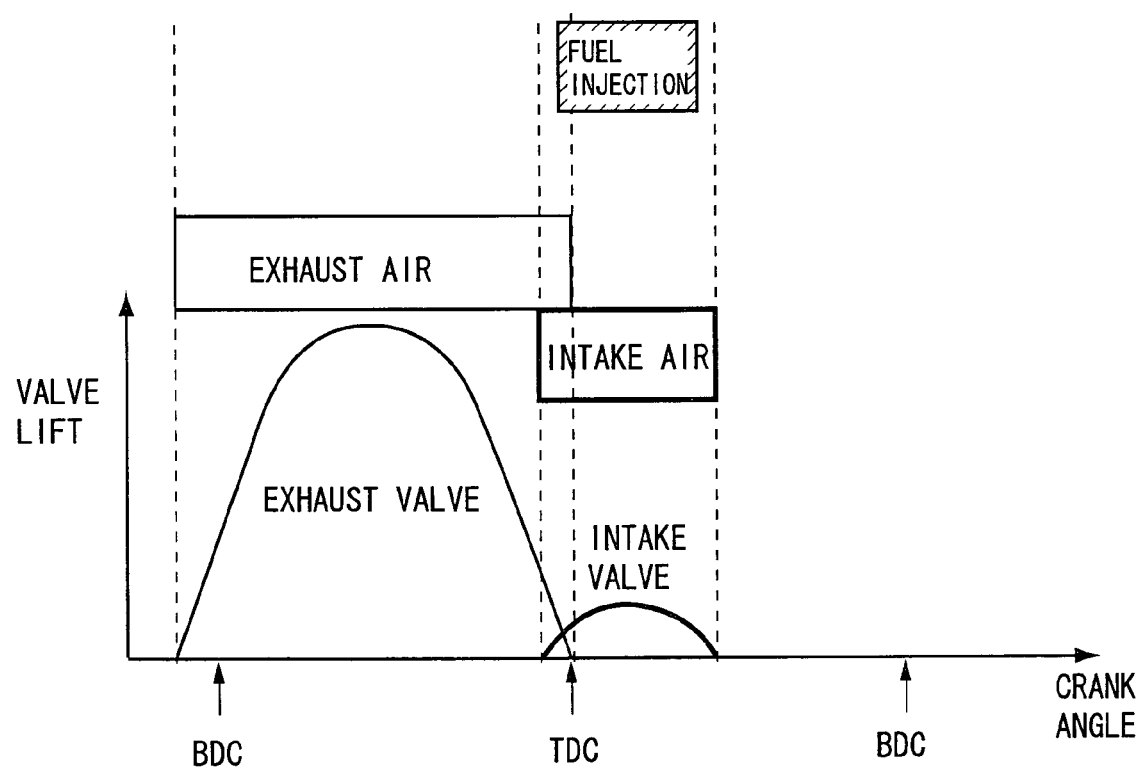
FIG. 16 is a graph showing a correlation between a valve lift characteristic, an intake stroke and an injection period.

Accordingly, in the low load and low rotation region, intake valve 105 is opened/closed with an opening characteristic as shown in FIG. 16.

Target operating angle TGVEL is input to a total valve opening area calculating section 304.

In total valve opening area calculating section 304, target operating angle TGVEL is converted into a total opening area of intake valve 105.

The total opening area is an integral value of a valve opening area within the opening period of intake valve 105.

The total opening area of intake valve 105 is output to a multiplier 312.

In multiplier 312, the total opening area is multiplied by a correction coefficient calculated by a correction coefficient calculating section 313, to be output as an effective opening area TVELAA0.

Correction coefficient calculating section 313 sets a larger correction coefficient ($\geq 1.0$) as engine rotation speed Ne is higher.

In VEL mechanism 12 in this embodiment, as engine rotation speed Ne becomes higher, the valve lift is likely to become larger than a target due to an inertial force.

As a result, there is caused an error between the opening area calculated based on target operating angle TGVEL and target phase angle TGVTC, and an actual opening area.

Therefore, in correction coefficient calculating section 313, the correction coefficient is set corresponding to the likelihood that as engine rotation speed Ne is higher, the valve lift becomes larger than the target.

In a flow loss correction coefficient calculating section 314, a flow loss coefficient CD is calculated based on target operating angle TGVEL (target valve lift).

Then, in a multiplier 315, effective opening area TVELAA0 is multiplied by flow loss coefficient CD, to be corrected corresponding to a difference of flow loss due to the valve lift amount.

Effective opening area TVELAA0 corrected by being multiplied by flow loss coefficient CD is divided by effective discharge amount (total cylinder volume) VOL# in a divider 316 and then divided by engine rotation speed Ne in a divider 317, to be converted into a state amount AANV.

Further, state amount AANV is converted into a volume flow ratio TQH0VEL of intake valve 105 in a converting section 318.

Volume flow ratio TQH0VEL of intake valve 105 is a value on the assumption that throttle valve 103b is fully opened.

In a divider 319, target volume flow ratio TQH0ST is divided by volume flow ratio TQH0VEL, to calculate a volume flow ratio QH0 requested to throttle valve 103b for obtaining target volume flow ratio TQH0ST.

Volume flow ratio QH0 requested to throttle valve 103b is converted into state amount AANV in a converting section 320.

Further, state amount AANV is multiplied by effective discharge amount (total cylinder volume) VOL# in a multiplier 321 and then multiplied by engine rotation speed Ne in a multiplier 322, to obtain an opening area AA requested to throttle valve 103b.

Then, opening area AA is converted into a target opening TGTVO of throttle valve 103b in a converting section 323, and electronically controlled throttle 104 is controlled based on target opening TGTVO.

Figure 15:
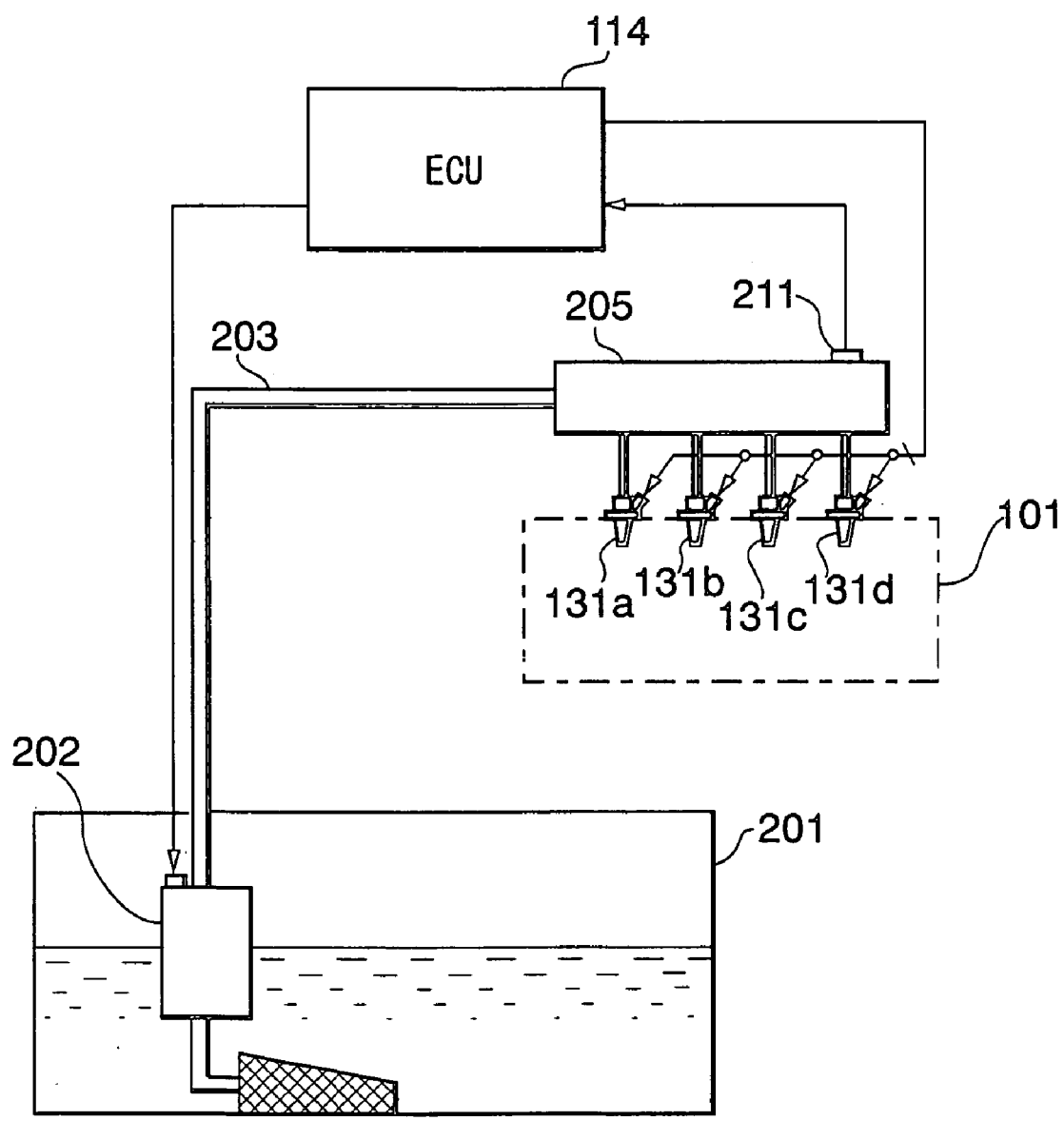
FIG. 15 is a diagram of a system structure showing a fuel pressure control apparatus in the embodiment.

FIG. 15 is a diagram showing a fuel pressure control system in engine 101.

In FIG. 15, a fuel tank 201 is disposed with a motor type fuel pump 202 on the inside thereof.

A fuel supply pipe 203 has one end connected to a discharge port of fuel pump 202 and the other end connected to a fuel gallery pipe 205 which is fixed near cylinder heads of engine 101 along a cylinder array.

Thus, fuel sucked by fuel pump 202 from fuel tank 201 is sent under pressure to fuel gallery pipe 205.

Fuel gallery pipe 205 is connected with fuel injection valves 131a to 131d (in case of four-cylinder engine) disposed for each cylinder.

Fuel pump 202 has a characteristic in that a discharge amount thereof is changed in proportion to an applied voltage.

In fuel gallery pipe 205, there is disposed a fuel pressure sensor 211 detecting a pressure P of fuel supplied to fuel injection valves 131a to 131d.

Engine control unit 114 feedback controls the applied voltage to fuel pump 202, so that a detection result of fuel pressure sensor 211 coincides with a target fuel pressure.

Here, for fuel injection by fuel injection valves 131a to 131d, as shown in FIG. 16, fuel injection timing and an injection quantity per unit time are set, so that the fuel injection is performed within the opening period of intake valve 105, even in a low valve lift condition where the closing timing of intake valve 105 is set before the bottom dead center (BDC).

In the low valve lift condition, if the fuel injection can be performed within the opening period of intake valve 105, the fuel injected from fuel injection valve 131 is atomized by a strong intake air flow due to the low valve lift, and also the fuel is sucked gradually into the cylinder within the intake stroke, so that a uniform air-fuel mixture is formed in the cylinder.

Consequently, the formation of air-fuel mixture in the low load and low rotation area (low valve lift region) is improved, thereby enabling to reduce the fuel consumption and the emissions.

In a condition where the opening period of intake valve 105 is short, in order to inject a requested fuel quantity within the opening period, it is necessary to increase the injection quantity per unit time in fuel injection valve 131.

As a method of increasing the injection quantity per unit time in fuel injection valve 131, there is a method of using a large sized fuel injection valve as fuel injection valve 131, or a method of setting in advance the fuel pressure supplied to fuel injection valve 131 to be high in conformity with the time of low valve lift.

However, it is more preferable that the fuel pressure supplied to fuel injection valve 131 is variably set according to the opening period of intake valve 105, which is varied according to the valve lift (valve operating angle) of intake valve 105 and engine rotation speed Ne.

A fuel injection control for setting the fuel pressure according to the opening period of intake valve 105 will be described hereunder.

Figure 17:
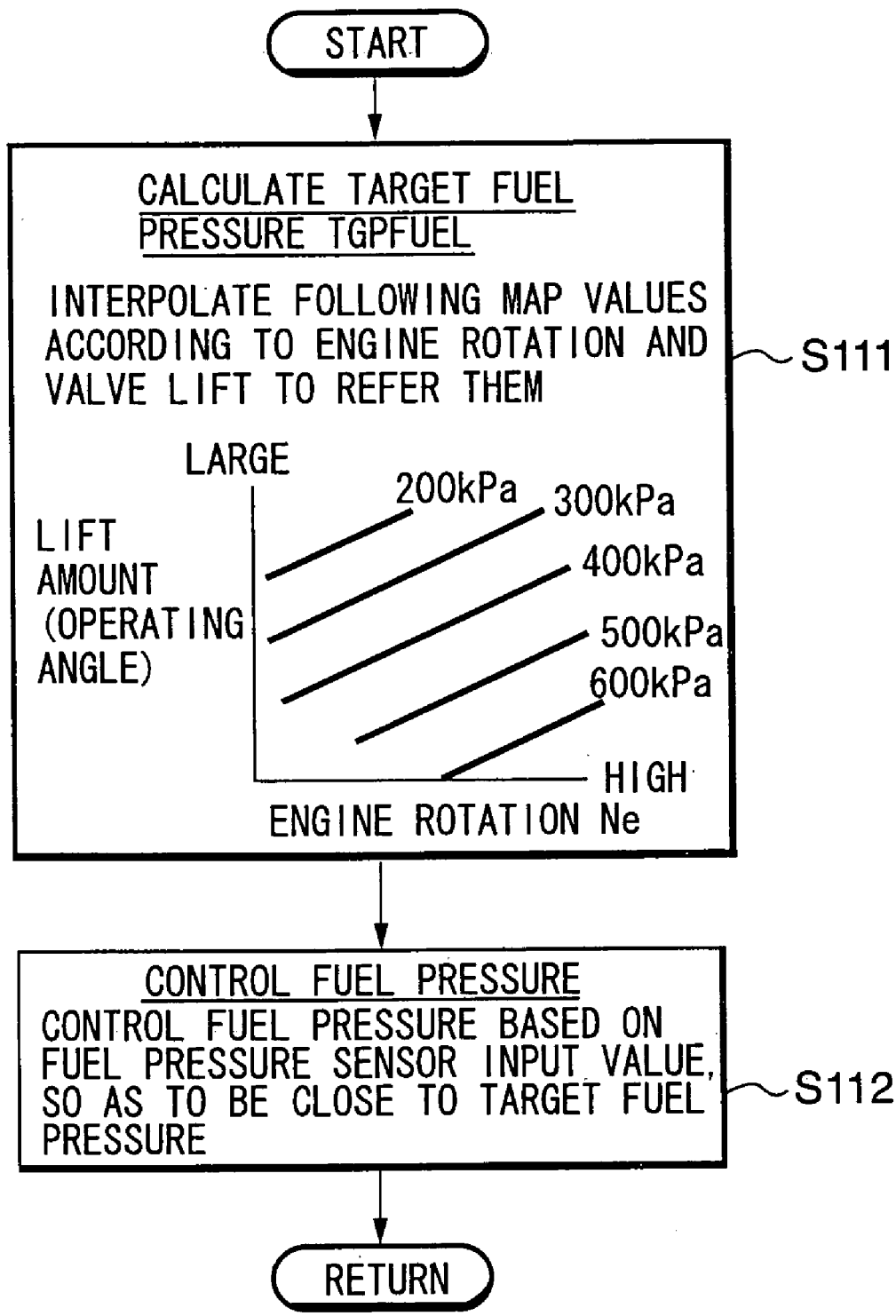
FIG. 17 is a flowchart showing a fuel pressure control in the embodiment.

A flowchart of FIG. 17 shows a control of fuel pump 202 by engine control unit 114.

In step S111, a map in which target fuel pressures are stored in advance according to the valve lift (valve operating angle) of intake valve 105 controlled by VEL mechanism 112 and engine rotation speed Ne, is referred to, to retrieve a target fuel pressure corresponding to the valve lift (valve operating angle) and engine rotation speed Ne at the time.

Note, in retrieving the target fuel pressure from the map, it is preferable to obtain the target fuel pressure corresponding to a state of map grid spacing by the interpolating calculation.

Provided that the valve lift (valve operating angle) of intake valve 105 is fixed, as engine rotation speed Ne becomes higher, the opening period of intake valve 105 becomes shorter.

Further, provided that engine rotation speed Ne is fixed, as the valve lift (valve operating angle) of intake valve 105 is smaller, the opening period of intake valve 105 becomes shorter.

The target fuel pressure is set in conformity with a characteristic of the opening period of intake valve 105, and as the opening period becomes shorter, the target fuel pressure is set to a higher value.

If the target fuel pressure rises, since the injection quantity per unit valve opening period in fuel injection valve 131 is increased with this rise, an injection period (injection pulse width) required for the injection of requested fuel quantity becomes shorter.

The target fuel pressure is set to the minimum pressure at which the fuel of requested quantity can be injected within the opening period of intake valve 105 (refer to FIG. 16).

Thus, even in the small valve operating angle state (low valve lift region) where the closing timing of intake valve 105 is set before the bottom dead center, and also even in the case where engine rotation speed Ne is high and the opening period of intake valve 105 is short, it becomes possible to perform the fuel injection by the fuel injection valve within the opening period of intake valve 105.

In step S112, the applied voltage to fuel pump 202 is feedback controlled, so that the fuel pressure detected by fuel pressure sensor 211 coincides with the target fuel pressure.

Figure 18:
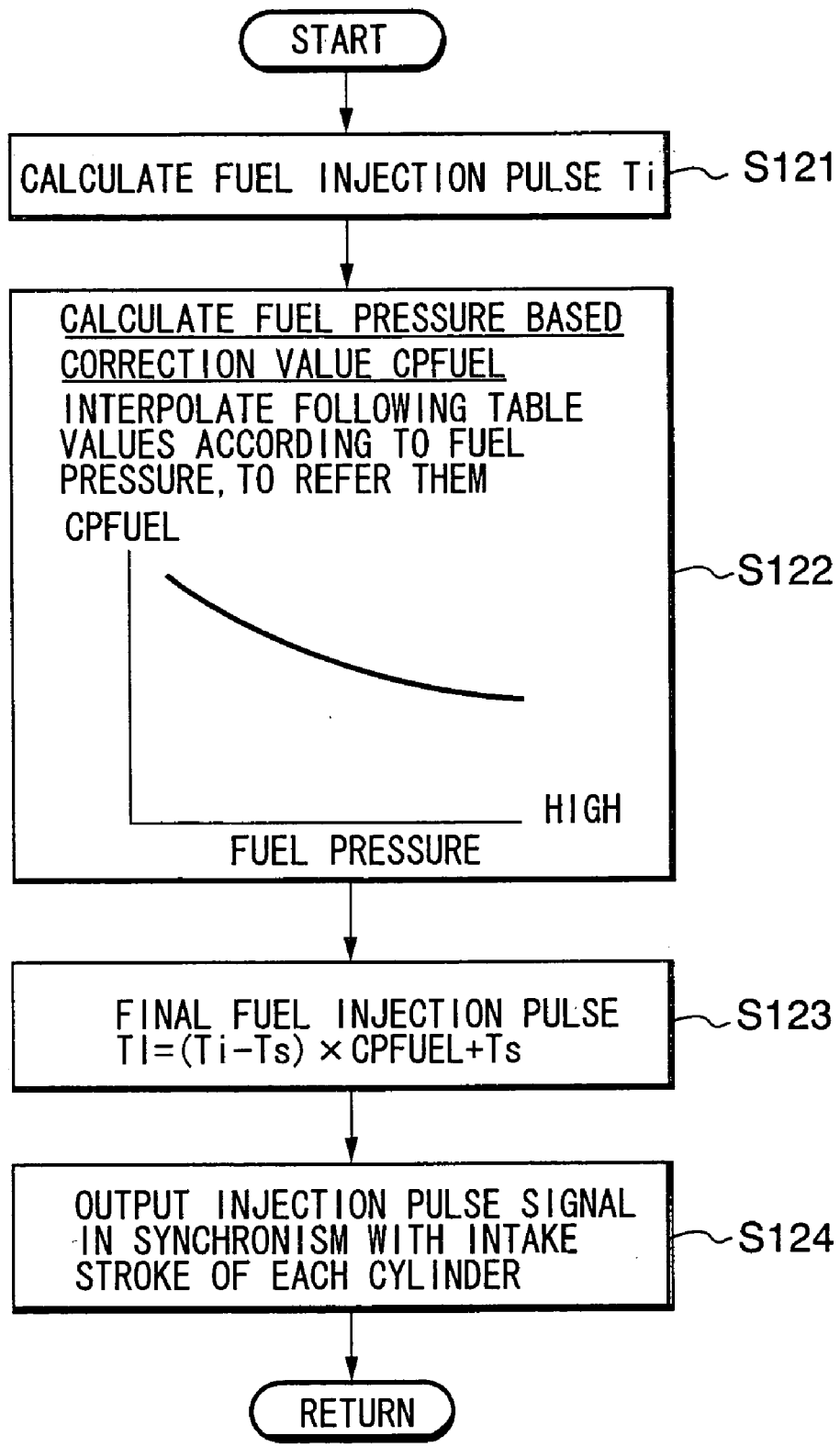
FIG. 18 is a flowchart showing a fuel injection control in the embodiment.

A flowchart of FIG. 18 shows a control of fuel injection valve 131 by engine control unit 114.

In step S121, a fuel injection pulse width Ti (injection period) at a basic fuel pressure is calculated based on intake air amount Q, engine rotation speed Ne, cooling water temperature Tw, a battery voltage and the like.

To be specific, a basic injection pulse width Tp is calculated based on intake air amount Q and engine rotation speed Ne, a correction coefficient CO is set based on the cooling water temperature and the like, and further, an ineffective injection pulse width Ts is set based on the battery voltage.

Then, injection pulse width Ti is calculated as Ti=Tp× CO+Ts.

In next step S122, a fuel pressure based correction value CPFUEL for injection pulse width Ti is set according to the fuel pressure at the time.

Correction value CPFUEL is for adapting fuel injection pulse width Ti calculated in conformity with a reference fuel pressure (a reference value of injection quantity per unit valve opening period) to the injection quantity per unit valve opening period at the time, and is set to a smaller value as the fuel pressure is higher at which the injection quantity per unit valve opening period is increased.

That is, when the fuel pressure is higher than the reference fuel pressure and the injection quantity per unit valve opening period is larger, injection pulse width Ti (injection period) is corrected to be smaller, so that the fuel of requested quantity is injected with the corrected injection pulse width Ti.

In step S123, injection pulse width Ti is corrected based on correction value CPFUEL, to set a final injection pulse width TI.

$$TI=(Ti-Ts)\times CPFUEL+Ts$$

Injection pulse width Ti contains ineffective injection pulse width Ts, and injection pulse width corresponding to the requested injection quantity (effective injection pulse width Te) is Te=Ti−Ts. Therefore, effective injection pulse width Te=Ti−Ts is multiplied by correction value CPFUEL, and then added with ineffective injection pulse width Ts, to obtain final injection pulse width TI.

In step S124, the injection pulse signal with injection pulse width TI is output to fuel injection valve 131 in synchronism with the opening timing (intake stroke) of intake valve 105 of each cylinder.

To be specific, injection start timing is reverse calculated based on the injection pulse width, to output the injection pulse signal, so that the injection pulse signal starts to be output in synchronism with the opening timing of intake valve 105 of each cylinder, or the fuel injection is finished immediately before the closing timing of intake valve 105.

Here, the constitution is such that the pressure of fuel supplied to fuel injection valve 131 is changed based on the opening period of intake valve 105 that is varied according to the valve lift (valve operating angle) of intake valve 105 by VEL mechanism 112 and engine rotation speed Ne, so that the fuel of requested quantity can be injected within the opening period of intake valve 105.

Figure 14:
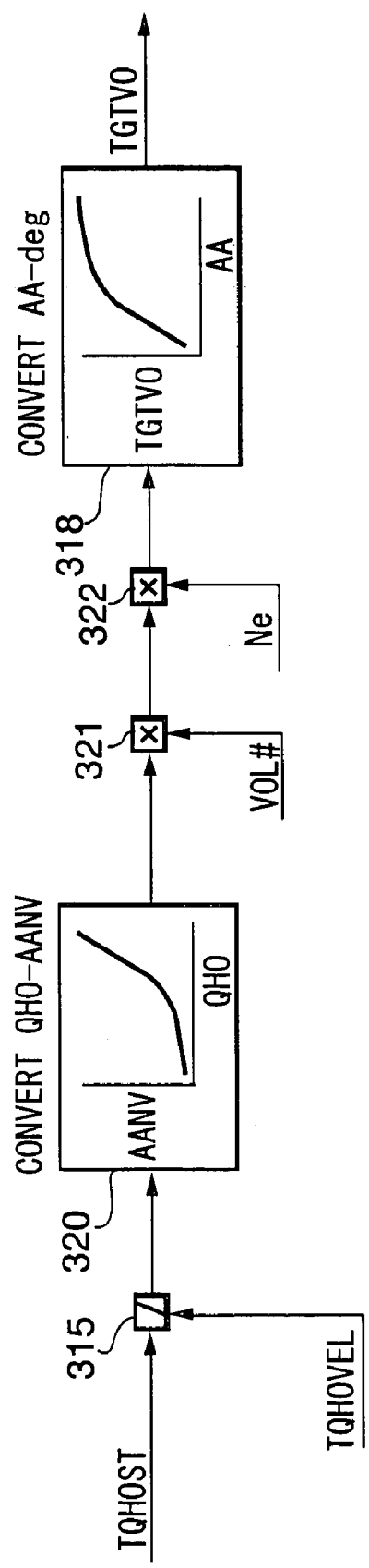
FIG. 14 is a block diagram showing the intake air amount control in the embodiment.

Accordingly, the fuel injection is performed within the opening period of intake valve 105 (refer to FIG. 14).

If the constitution is such that the fuel injection is performed within the opening period of intake valve 105, it is possible to atomize all of fuel due to the intake air flow within the intake stroke, and in particular, the intake air flow is strengthened in the low valve lift region where the closing timing of intake valve 105 is set before the bottom dead center, thereby achieving a large atomization effect.

Moreover, since the fuel injection is started in synchronism with the opening timing of intake valve 105 and thereafter the fuel is continuously sucked into the cylinder within the intake stroke, a uniform air-fuel mixture can be formed in the cylinder, thereby enabling to improve the air-fuel mixture formation as well as the atomization effect, and to reduce the fuel consumption and the emissions.

In the above embodiment, VEL mechanism 112 that varies continuously the valve lift and valve operating angle of intake valve 105, has been used, however, the constitution may be such that the valve lift and valve operating angle are switched in stepwise by the switching of cam, and the like.

Further, the constitution may be such that a lift characteristic of a valve body of fuel injection valve 131 is changed according to the opening period of intake valve 105 without changing the fuel pressure, so that the injection quantity per unit time of fuel injection valve 131 is changed corresponding to the opening period of intake valve 105.

Moreover, the constitution may be such that the fuel injection is performed within the opening period of intake valve 105 only in the low load region (low valve lift region), and in a high load region (high valve lift region) where the closing timing of intake valve 105 is at or after the bottom dead center, the fuel injection is started before the opening timing of intake valve 105.

The entire contents of Japanese Patent Application No. 2002-191034, filed Jun. 28, 2002, a priority of which is claimed, are incorporated herein by reference.

While only a selected embodiment has been chosen to illustrate the present invention, it will be apparent to those skilled in the art from this disclosure that various change and modification can be made herein without departing from the scope of the invention as defined in the appended claims.

Furthermore, the foregoing descriptions of the embodiment according to the present invention are provided for illustration only, and not for the purpose of limiting the invention as defined by the appended claims and their equivalents.

What is claimed is:

1. An apparatus for controlling fuel injection of an engine provided with an intake valve and a fuel injection valve disposed on the upstream side of said intake valve, comprising:
   an injection quantity regulator varying an injection quantity per unit time of said fuel injection valve;
   an opening time period detector detecting an opening time period of said intake valve; and
   a controller controlling said injection quantity regulator according to the opening time period detected by said opening time period detector.

2. An apparatus for controlling fuel injection of an engine according to claim 1,
   wherein said engine is provided with a variable valve event and lift mechanism that varies a valve lift and a valve operating angle of said intake valve, and
   said opening time period detector detects the valve operating angle of said intake valve and a rotation speed of said engine as a state amount correlating to the opening time period of said intake valve.

3. An apparatus for controlling fuel injection of an engine according to claim 2, wherein said controller controls said injection quantity regulator, so that a fuel injection period of said fuel injection valve becomes shorter than the opening time period of said intake valve at least in a low valve lift region of said intake valve.

4. An apparatus for controlling fuel injection of an engine according to claim 3, wherein there is provided an injection timing controller controlling injection timing of said fuel injection valve, so that fuel injection by said fuel injection valve is performed within the opening time period of said intake valve at least in the low valve lift region.

5. An apparatus for controlling fuel injection of an engine according to claim 2, wherein said controller controls the injection quantity per unit time to become larger as the rotation speed of said engine is higher.

6. An apparatus for controlling fuel injection of an engine according to claim 2, wherein said controller controls the injection quantity per unit time to become larger as the valve operating angle of said intake valve is smaller.

7. An apparatus for controlling fuel injection of an engine according to claim 1, wherein said injection quantity regulator is a fuel pressure regulator varying a pressure of fuel supplied to said fuel injection valve, and regulates the injection quantity per unit time by regulating the pressure of fuel.

8. An apparatus for controlling fuel injection of an engine according to claim 1, wherein said injection quantity regulator is a lift regulator regulating a lift of a valve body of said fuel injection valve, and regulates the injection quantity per unit time by regulating the lift of said valve body.

9. An apparatus for controlling fuel injection of an engine according to claim 2,
   wherein said engine is provided with a variable valve timing mechanism that varies a central phase of the valve operating angle of said intake valve, and
   in a predetermined low load region where closing timing of said intake valve is set before the bottom dead center by said variable valve event and lift mechanism and said variable valve timing mechanism,
   said controller controls said injection quantity regulator, so that a fuel injection period of said fuel injection valve becomes shorter than the opening time period of said intake valve.

10. An apparatus for controlling fuel injection of an engine according to claim 2,
    wherein said variable valve event and lift mechanism comprises:
    a camshaft rotatingly linked with said engine;
    a control shaft disposed substantially in parallel to said camshaft;
    a control cam biased to be fixed to a periphery of said control shaft;
    a rocker arm swingingly and axially supported by said control cam;

a swing driving member driving one end portion of said rocker arm to swing according to the rotation of said camshaft;

a swing cam connected to the other portion of said rocker arm to swing, and operating said intake valve to be opened; and an actuator driving said control shaft to be rotated.

11. An apparatus for controlling fuel injection of an engine provided with an intake valve and a fuel injection valve disposed on the upstream side of said intake valve, comprising:

injection quantity regulating means for varying an injection quantity per unit time of said fuel injection valve;

opening time period detecting means for detecting an opening time period of said intake valve; and control means for controlling said injection quantity regulating means according to the opening time period detected by said opening time period detecting means.

12. A method of controlling fuel injection of an engine provided with an intake valve and a fuel injection valve disposed on the upstream side of said intake valve, comprising the steps of:

detecting an opening time period of said intake valve; and controlling an injection quantity per unit time of said fuel injection valve.

13. A method of controlling fuel injection of an engine according to claim 12, wherein said engine is provided with a variable valve event and lift mechanism that varies a valve lift and a valve operating angle of said intake valve, and said step of detecting the opening time period detects a valve operating angle of said intake valve and a rotation speed of said engine as a state amount correlating to the opening time period of said intake valve.

14. A method of controlling fuel injection of an engine according to claim 13, wherein said step of controlling the injection quantity per unit time controls the injection quantity per unit time, so that a fuel injection period of said fuel injection valve becomes shorter than the opening time period of said intake valve at least in a low valve lift region of said intake valve.

15. A method of controlling fuel injection of an engine according to claim 14, further comprising the step of controlling injection timing of said fuel injection valve, so that fuel injection by said fuel injection valve is performed within the opening time period of said intake valve at least in the low valve lift region.

16. A method of controlling fuel injection of an engine according to claim 13, wherein said step of controlling the injection quantity per unit time controls the injection quantity per unit time to become larger as the rotation speed of said engine is higher.

17. A method of controlling fuel injection of an engine according to claim 13, wherein said step of controlling the injection quantity per unit time controls the injection quantity per unit time to become larger as the valve operating angle of said intake valve is smaller.

18. A method of controlling fuel injection of an engine according to claim 12, wherein said step of controlling the injection quantity per unit time controls a pressure of fuel supplied to said fuel injection valve, to control the injection quantity per unit time of said fuel injection valve.

19. A method of controlling fuel injection of an engine according to claim 12, wherein said step of controlling the injection quantity per unit time controls a lift of a valve body of said fuel injection valve, to control the injection quantity per unit time of said fuel injection valve.

20. A method of controlling fuel injection of an engine according to claim 13, wherein said engine is provided with a variable valve timing mechanism that varies a central phase of the valve operating angle of said intake valve, and in a predetermined low load region where closing timing of said intake valve is set before the bottom dead center by said variable valve event and lift mechanism and said variable valve timing mechanism, said step of controlling the injection quantity per unit time controls the injection quantity of said fuel injection valve, so that a fuel injection period of said fuel injection valve becomes shorter than the opening time period of said intake valve.

* * * * *